Nov. 10, 1953  J. M. A. ALLAIS  2,658,671
DISK SLIDE RULE WITH DECIMAL POINT INDICATOR
Filed Jan. 4, 1952  7 Sheets-Sheet 1

INVENTOR
JULIEN MARIE ANDRE ALLAIS
By Linton and Linton
ATTORNEYS

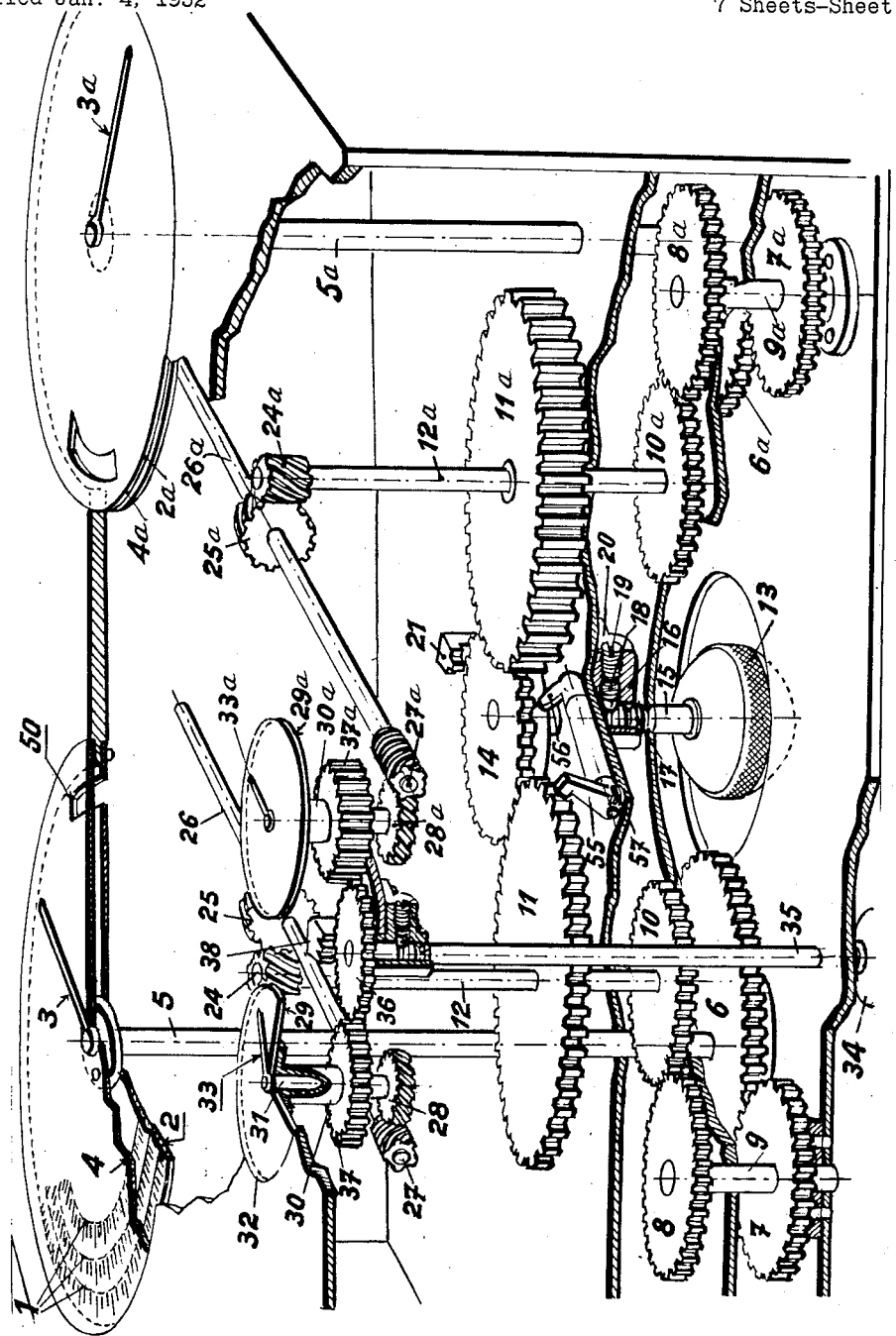

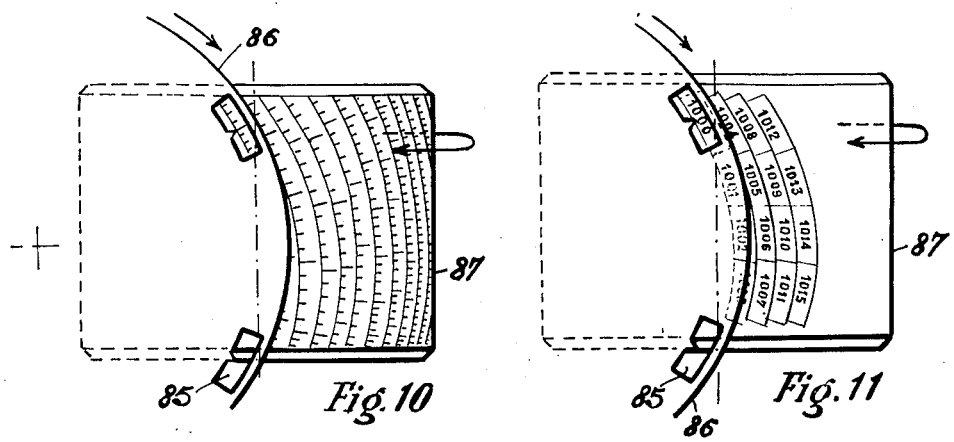
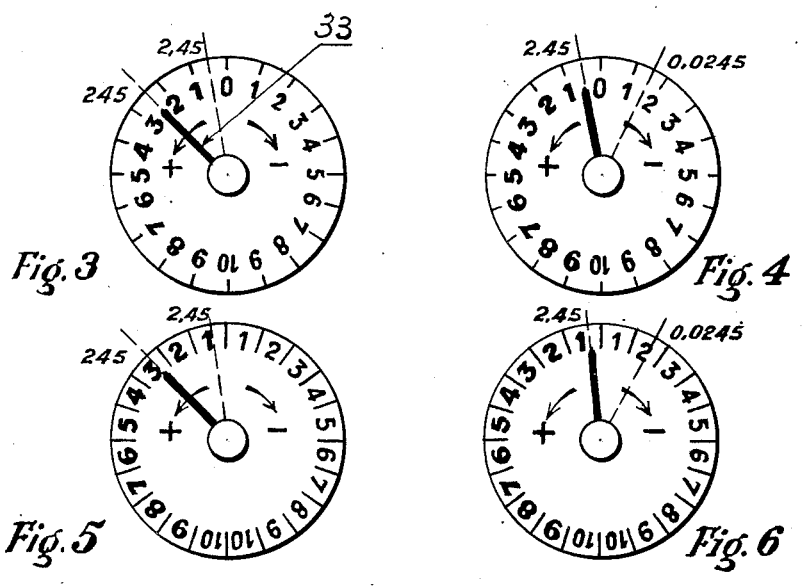

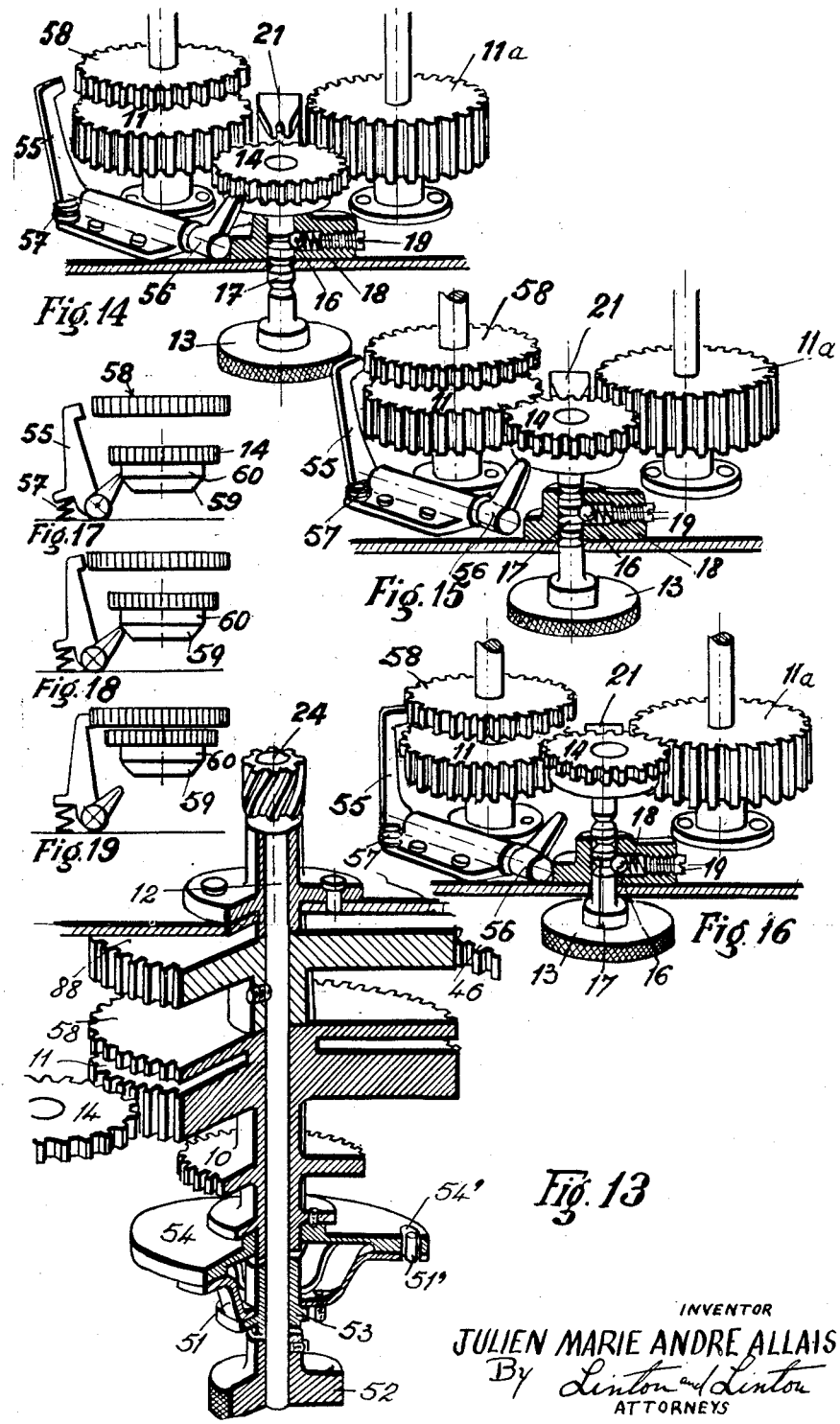

Nov. 10, 1953  J. M. A. ALLAIS  2,658,671
DISK SLIDE RULE WITH DECIMAL POINT INDICATOR
Filed Jan. 4, 1952  7 Sheets-Sheet 7
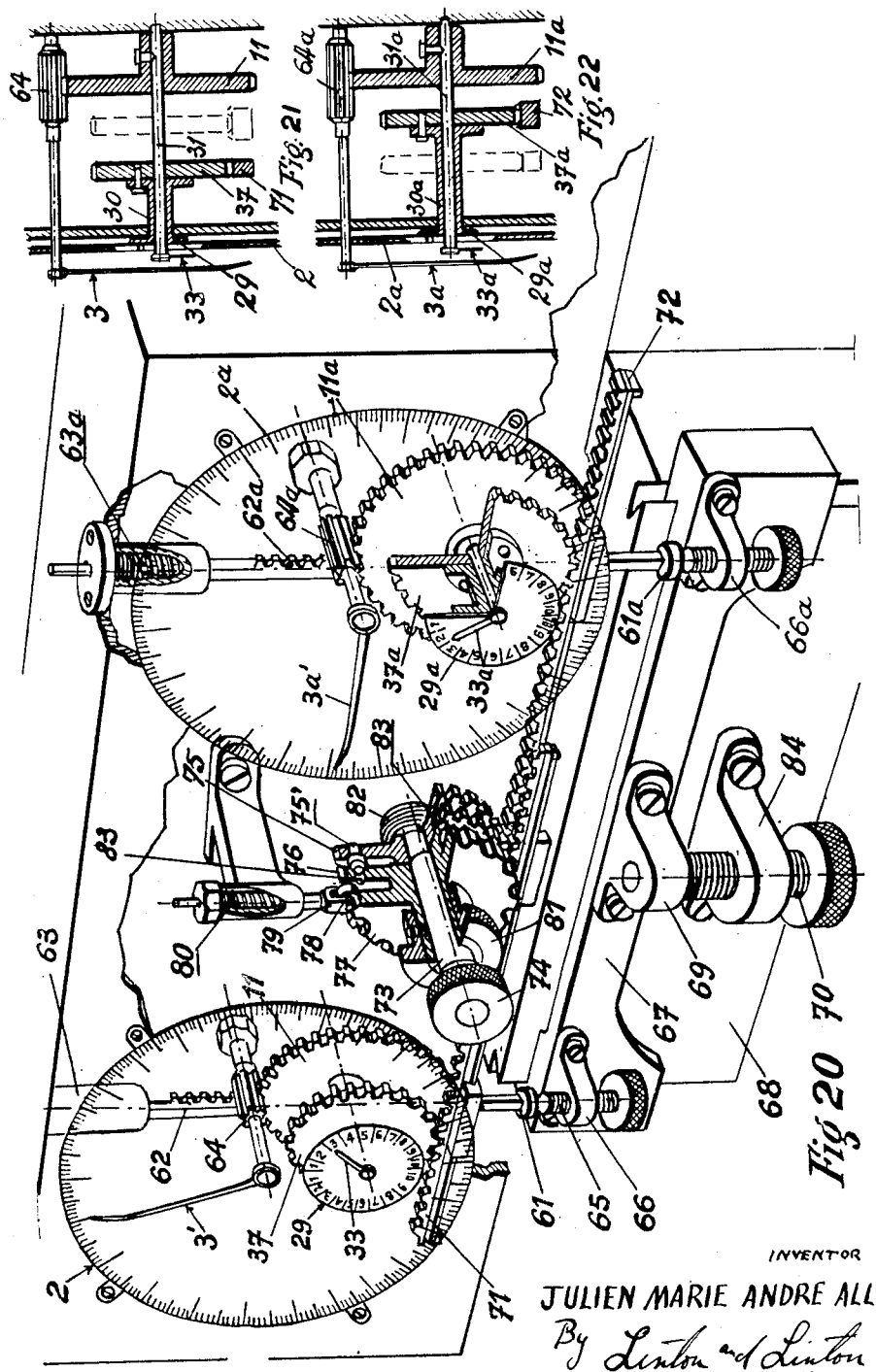
INVENTOR
JULIEN MARIE ANDRE ALLAIS
By Linton and Linton
ATTORNEYS Patented Nov. 10, 1953

2,658,671

UNITED STATES PATENT OFFICE 2,658,671

DISK SLIDE RULE WITH DECIMAL POINT INDICATOR

Julien Marie André Allais, Boulogne-sur-Seine, France

Application January 4, 1952, Serial No. 264,922

Claims priority, application France January 5, 1951

20 Claims. (Cl. 235—61)

This invention relates to a selecting device applicable especially to calculations of any kind, and, more particularly, to slide rules with circular scales.

A device according to the invention comprises essentially a fixed circular scale with one or more graduations or rows of terms or symbols, an indicating hand, moving angularly at the center of said circular scale, an axle controlling said hand, means for transmitting the motion from said axle to said hand.

On the device may also be provided, separately or in combination, an adidtional dial for allowing the reading or the placing of the decimal point of any numerical value indicated by the hand, means for moving a hand called "decimal point hand," on said adidtional dial, an amplifying reading surface movable with respect to fixed or moving indexes, permitting to considerably extend the scale and, finally, means for synchronizing the movement of said amplifying surface with that of the indicating hand moving on the fixed circular scale.

The intervals between the division lines of the additional dial, or decimal point dial, will be preferably graduated in rows (positive or negative) of the first significant figure on the left of the value read on the fixed circular scale.

The amplifying reading surface may consist of a film or a drum on the surface of which portions of discontinuous curves are drawn, in generations, surveyed, in a continuous way, by indexes.

The amplifying surface for extending the scale allows either a greater accuracy in reading, through multiplication of the intermediary divisions between those made on the circular scale, or engraving along the extended scale (for direct reading, optical magnifying or projection) terms, in figures easy to read, of a geometrical progression series whose ratio is $$r = \sqrt[n-1]{\frac{1}{a}}$$

where 1 and $a$ are the first and last terms, $n$ is the number of terms and $r$ is the ratio between terms or $$r = \sqrt[m]{10}$$

with 1 equaling 10, $a$ equaling 1 and $n-1$ equaling $m$, allowing approached calculations, all the more accurate as $m$ is greater.

A device according to the invention and such as briefly described hereinabove is called an indicator. As indicator can be used alone or several indicators can be used simultaneously, whether or not connected to each other through joining mechanisms. Two indicators, connected in the manner as above mentioned, through joining means, whether hand controlled or electromechanically controlled, can form a circular scale slide rule of quite a new type, distinguishing from the conventional circular slide rules by the fact that the two scales are not concentrical with respect to each other, but they are placed, side by side and have different centers.

A single indicator can be used for selecting a term or a symbol to be read or projected, belonging to a table which can reach 10,000 terms or symbols of any kind, ranged in a predetermined order, or even more than 10,000 terms, if necessary. The symbols may be figures belonging to an arithmetical, geometrical progression series, or else, to logarithms, trigonometrical values, table columns, as may be seen in conventional or specialized formulas, indexed names, diagrams, images, groups of perforations, conventional signs or groups of conventional signs, belonging to a previously predetermined code.

An indicator may be used in the emitting, stopping or working of currents of waves, by means of direct or magnetic relay contactors or photoelectrical cells. If it is provided with an arithmetrical progression table, an indicator may be used for measuring, adding up or substracting the linear or angular displacements of a part of a machine to which it is connected.

By using, whether simultaneously or not, several joined or separated indicators, it is possible to obtain simultaneously a plurality of information or services, or judicious combinations of such information or services, similar to those provided by a single indicator.

In the attached drawings, and by way of example, several embodiments of the invention, which has been applied to a circular scale slide rule, have been illustrated and which are in no way limitative.

In the drawings:

Fig. 2 is a view similar to that of Fig. 1 in which are shown, in addition, means for reading or placing the decimal point.

Figs. 3 to 6 show two systems of graduations of the additional dials or decimal point dials of Fig. 2.

Figs. 10 and 11 illustrate different manners of graduating the scale of the drum of Fig. 9.

Fig. 13 is a view showing in detail an auxiliary mechanism of the device for extending the circular scale of Fig. 12.

Figs. 14 to 16 and Figs. 17 to 19 show corresponding perspective views and orthogonal views of means for locking the calculation hand and the decimal point dial of the left indicator of a slide rule according to the invention while a value is being sought on the right indicator or a desired interval on the right decimal point dial.

Fig. 20 shows a perspective view of a different slide rule according to the invention characterised by a particular device for indicating the decimal point.

Figs. 21 and 22 are two detail transverse sections along the axes of the indicating hands and the decimal point hands of the left and right indicators of Fig. 20.

Figure 1:
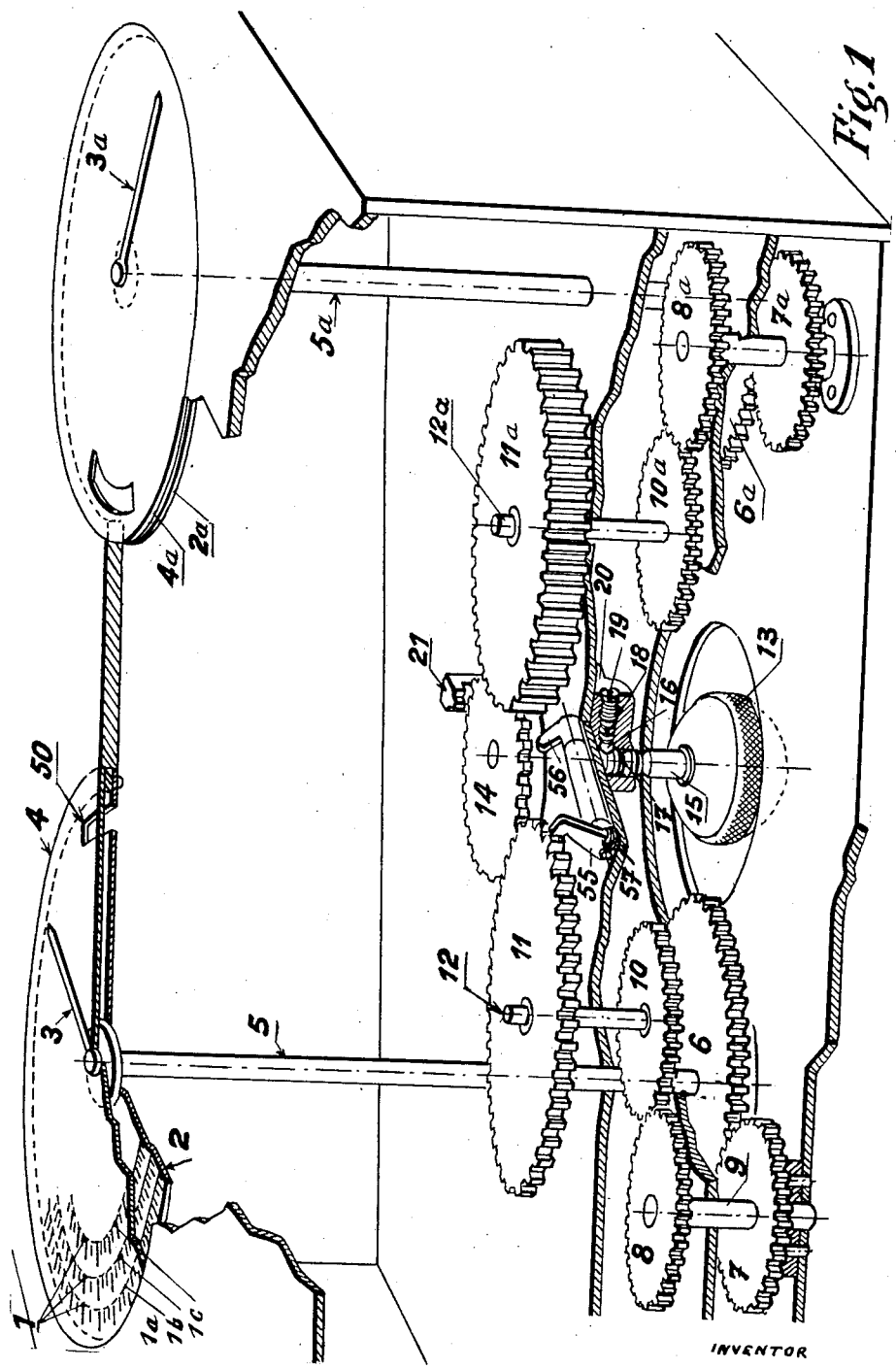
Fig. 1 is a perspective view of a slide rule with circular scales, comprising two indicators joined through a gearing system connecting the hands of the circular scales.

On Fig. 1, reference numeral 1 refers to a circular scale with several graduations engraved on a fixed dial 2 on which rotates a radius arm 3 marked on a transparent disc 4 fixed to an axle 5 perpendicular to said disc on its center. The radius arm 3 acts as a hand for indicating several series of corresponding values marked on several concentric graduations 1a, 1b, 1c, etc., which may, for instance, correspond to the numerical values scale (length of arcs proportionate to logarithms), squares, cubes, logarithms, sine, tangents. The axle 5 carries a cog wheel 6 engaging a toothed wheel 7 mounted on an axle 9 on which is fixed a toothed wheel 8 engaging a toothed wheel 10 fixed to an axle 12 on which, in turn, is mounted a cog wheel 11.

The machine illustrated on Fig. 1 comprises two similar arrangements, hereinafter referred to as indicators, the parts of the right one similar to those of the left indicator being referenced by the additional character a. These two indicators are arranged symmetrically with respect to a connecting mechanism comprising a control knob 13 and a cog wheel 14 mounted on the axle 15. Under the upward pressure of the knob 13, the wheel 14 can occupy three positions, and in each one it is locked by a ball 16 bearing into the grooves of the axle 15 under the pressure of a spring 18 whose tension is adjustable by means of a screw 19; a central bearing 20 receives the parts 16, 18 and 19. The cog wheel 11a of the right side indicator keeps in constant engagement with the movable gearing wheel 14 in the three longitudinal positions that the latter can occupy.

In its lower position, the wheel 14 engages the wheel 11a of the right indicator and the wheel 11 of the left indicator, the teeth of the latter being shorter than those of the wheel 11a of the right indicator. The wheel 14 can occupy its middle position only if one of its teeth can engage a portion of a rack 21 of same modulus, which can comprise a single denticle or a single groove between two denticles. The engagement of the wheel 14 with the rack 21 is facilitated by the provision in the latter of indentures for the teeth. In said middle position of the wheel 14, the latter is locked by the rack 21 and so are, therefore, the two wheels 11 and 11a.

In its lower position, the wheel 14 controlled by the knob 13 can rotate the wheels 11 and 11a and therefore, the two hands 3 and 3a on the graduations 1a, 1b, 1c, which are thus divided into equal intervals.

In its upper position, the wheel 14 disengages the wheel 11, but still engages the wheel 11a (whose teeth are higher than those of the wheel 11) and also disengages the rack 21; nothing prevents it from rotating then and it is sufficient to rotate the wheel 14 to cause the wheel 11a of the right indicator to rotate.

The wheel 14 can then resume its lower position (passing by its middle position) and cause the simultaneous rotation of the two hands 3 and 3a the latter having been brought into a position no longer corresponding to that of the hand 3 when the wheel 14 was in its upper position at a higher level than the wheel 11 and the rack 21 and engaged only the wheel 11a.

The machine which has been described operates as follows:

Supposing that it is desired to determine $$X = \frac{A}{B} \times C$$

If $B=1$, the operation is a multiplication; if $C=1$, it is a division; if A, B and C are different from 1, it is a rule of three. The machine will operate in the same manner in the three cases.

If we put down the proportion $A:B=X:C$, the machine will be operated as follows: A is brought under the hand 3 of the left indicator and B under the hand 3a of the right indicator. To this end, the lower position of the wheel 14 is first used to rotate the left hand 3 through the wheel 11 to the nearest division to A, then the upper position of the wheel 14 to bring the hand 3a of the right indicator to the nearest division to B, without the hand of the left indicator moving. Thus, in the two indicators, the ratio A:B or basis ratio of the calculation has been put down. If the wheel 14 resumes its lower position without the hands 3 and 3a moving, and the two hands 3 and 3a which are then in non-corresponding positions, are rotated simultaneously, whenever the wheel 14 will be stopped, it indicates a ratio $Cn:Cn=A:B$; and the desired ratio $X:C$ will be obtained when C is under the right hand 3a and X will be read, except for the decimal point, under the left hand 3.

To each indicator, as above described, can be added a mechanism called "decimal point unit," shown on Figure 2 for indicating the position of the decimal point of the numerical values shown under the hands 3 and 3a whereby it is possible to read the position of the decimal point of the desired final result.

The axle 12 carries a twist pinion 24 driving a pinion 25 fixed to an axle 26 which at its other extremity carries a tangent screw 27 with one thread, engaging a twist pinion 28 with twenty pitches, for instance, for a dial (called "decimal point dial") 29 having twenty divisions. Said dial 29 is adjustable through rotation of its hollow shaft 30 through which extends the axle 31 of a transparent disc 32 carrying a radius 33 acting as an indexing hand on the decimal point dial 29. The axle 31 is controlled by the pinion 28.

The adjustment of the left dial 29 is similar to that of the left hand 3 and is effected by means of a knob 34 fixed to the sliding and rotating axle 35 allowing the gearing wheel 36 to which it is fixed, to drive in rotation the wheels 37 and 37a fixed to the axles 30 and 30a respectively; the locking of the wheel 36 on the rack 38 forces the dials 29 and 29a to have a difference of only a certain number of twentieth parts of the circumference. If, on the other hand, the ratio of the above mentioned gearing couplings is such that the axle 26 makes one revolution when the hand 3 also makes one, the hand 33 will, during this period, move over a division of the dial 29. Therefore, the hand 33 will pass exactly on any one of the divisions of the decimal point dial 29 whenever the hand 3 passes on the origin of its dial.

If we consider again, for instance, the above described operation to obtain X from the proportion $A:B=X:C$ (A:B being the basis ratio of the calculation), we shall now suppose that $A=245=2.45 \times 10^2$, for instance. The hands 3 and 33 of the left indicator being both on the origin of their respective graduations, the value $A=245$ is shown, except for the decimal point, on the left indicator by rotating the hand 3 in the direction of the increasing values; it will also be shown by the hand 33 in the first interval between two divisions of the dial, but on too small a scale to be accurately evaluated. If the hand 3 is then caused to make two revolutions in the direction of increasing values (in order to take into account the 2 power by which 2.45 must be multiplied to obtain $A=245$), the hand 33 will come between the divisions $10^2$ and $10^3$ (Fig. 3); thus the range of A has been recorded; in other words, its decimal point has been placed.

Supposing now that $A=0.0245=2.45 \times 10^{-2}$, for instance. If the hand 3 is then caused to make two revolutions in the direction of decreasing values (in order to take into account the power $-2$ of 10) by which 2.45 must be multiplied to obtain $A=0.0245$), the hand 33 comes between the divisions $10^{-1}$ and $10^{-2}$ (Fig. 4); thus the range of A has been recorded; in other words, its decimal point has been placed.

In the first case, the number of figures before the decimal point is $2+1=3$ figures; in the second case, the number of 0 between the decimal point and the first significant figure on the left is $2-1=$one. In order to eliminate this inconsistency regarding the placement of the demical point, one may refer no longer to 10 powers, but to what is more convenient, while being equivalent, namely to positive or negative rows (before or after the decimal point) occupied by the first significant figure on the left of a whole or decimal numerical value.

If, instead of graduating the decimal point dials 29 and 29a with divisions corresponding to 10 powers (positive or negative), from an origin at the nought power, the intervals are graduated into positive or negative rows of the first significant figure on the left of the considered value (A, for instance), an indication such as shown by Fig. 3 is obtained for $A=245$ and in Fig. 4, the position of the hand as indicated by the dotted line would be correct for $A=0.0245$.

If the groups of figures 3 and 4, on the one hand, and 5 and 6 on the other hand, are compared, it appears more convenient to adopt the graduation of figures 5 and 6 and to translate for $A=245$: figure 5, positive row (before the decimal point) of the first significant figure on the left=3 (read in the positive interval); and for $A=0.0245$ figure 6: negative row (after the decimal point) of the first significant figure on the left=$-2$ (read in the negative interval).

To obtain $A=245$ or $A=0.0245$ under the hand, 245 has been indicated first, except for the decimal point, in both cases, by causing the hand 3 to run all round the dial 2 in the direction of increasing values, then the hand 3 has been caused to make two revolutions in the positive direction for $A=245$, and two revolutions in the negative direction for $A=0.0245$.

This operation is not very convenient and is especially slow which may trouble the mind of the operator. In order to avoid such drawbacks, it is the dial of the decimal point which will be displaced in one direction or in the other to show under the decimal point hand 33 the proper interval.

The operation is effected as for the two non-concentric scales circle, described hereinabove, without the decimal point dials (Fig. 1), that is to say that A and B are made to appear under the calculation hands 3 and 3a then the rows of their first significant figures are noted on the corresponding dials 29 and 29a as shown by Fig. 2.

The two hands 3 and 3a being then fixed together in their non-corresponding positions and the two decimal point dials 29 and 29a being locked in their own non-corresponding positions by means of the rack 38, C is shown at the right indicator; then, retaining the dials 29 and 29a fixed together (wheel 36 in its lower position), the interval corresponding to the positive or negative row of the first figure of C is brought under the decimal point hand 33a of the right indicator, whereby it is possible to read on the two dials 2 and 29 (of calculation and of decimal point) of the left indicator the numerical value of X (except for the decimal point) and the positive or negative row of its first significant figure on the left.

In order to extend the circular scales of the two calculation dials 2 and 2a, it is necessary to use an amplifying surface, the simplest being a very long but finite luminous film, folded on itself, in the manner of an endless belt, the origin of the film being in front of a fixed index whenever the hand 3 passes over the origin of its dial.

Several modifications can be made in this simple arrangement in order to reduce the length of a film that would show, at the single index, a continuous scale.

Figure 7:
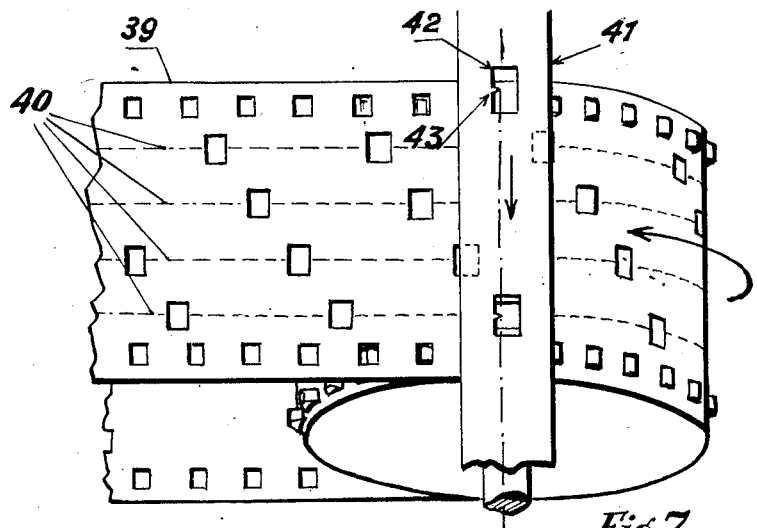
Fig. 7 is a perspective view of an amplifying reading surface allowing the extension of a circular scale.

In Fig. 7, for instance, there is shown a film 39 bearing several lines of terms 40; in the proximity of the generatrix of one of the driving drums along which the latter is in contact with the surveyed film, a narrow film 41 is provided moving in a direction perpendicular to that of the former and in a plane parallel to that of the former but as close as possible to it; the second film has holes 42 with survey indexes 43. The extension of the scale is then obtained by the outline traced by the moving indexes 43 of the holes 42 while they pass over the used width of the moving film 39; the next index 43 coming on said width upon the previous index 43 moving out of it. Said indexes 43 outline on the film 39 parallel oblique straight lines, obviously discontinuous, on which the same indexes having become surveying indexes instead of being drawing indexes, will pass, in a continuous way, in succession.

Figure 8:
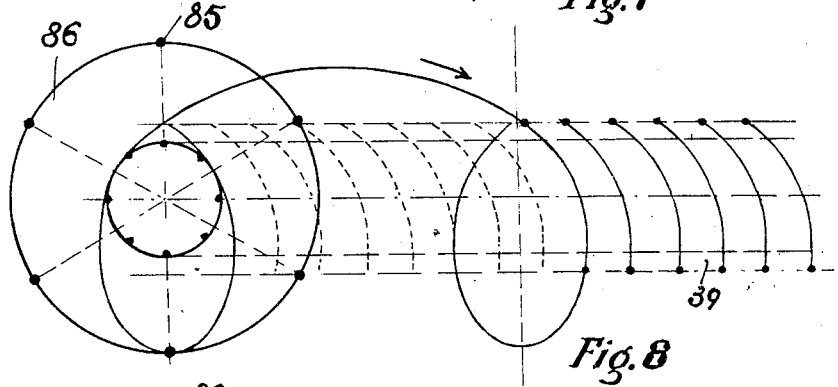
Fig. 8 is a diagrammatical representation of a different way to trace the curves and mark an amplifying surface for extending a circular scale.

On Fig. 8 there is shown diagrammatically a modification of the outline and survey of a film 39, by means of holes 85, at equal intervals from each other, placed on a same circumference of a survey disc 86 moving in a plane parallel to that of the film and as close as possible to the plane of the latter. The holes 85 have, like in the preceding case, indexes. The rotation axis of the disc 86 (perpendicular to the film) will be preferably located inside the width of the film and most conveniently in the middle of said width, or in the proximity thereof. On Fig. 8, the axle of the disc is placed in the middle of the used width of the film and the six holes 85, shown as dots in the diagram, outline discontinuous portions of epicycloids which can be later on surveyed, in a continuous way, by the indexes of the holes placed on the same circumference of the same disc.

Figure 9:
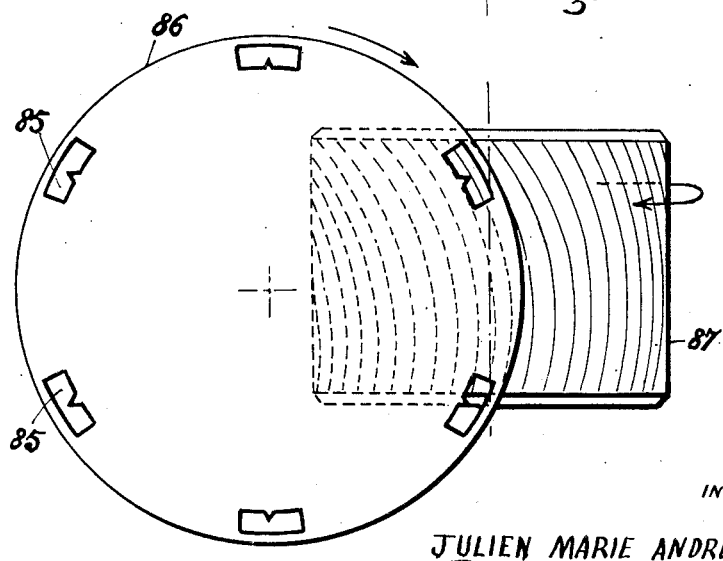
Fig. 9 illustrates another manner of tracing the curves, but on a drum or a film partly wound on the cylinder that drives the film.
Figure 12:
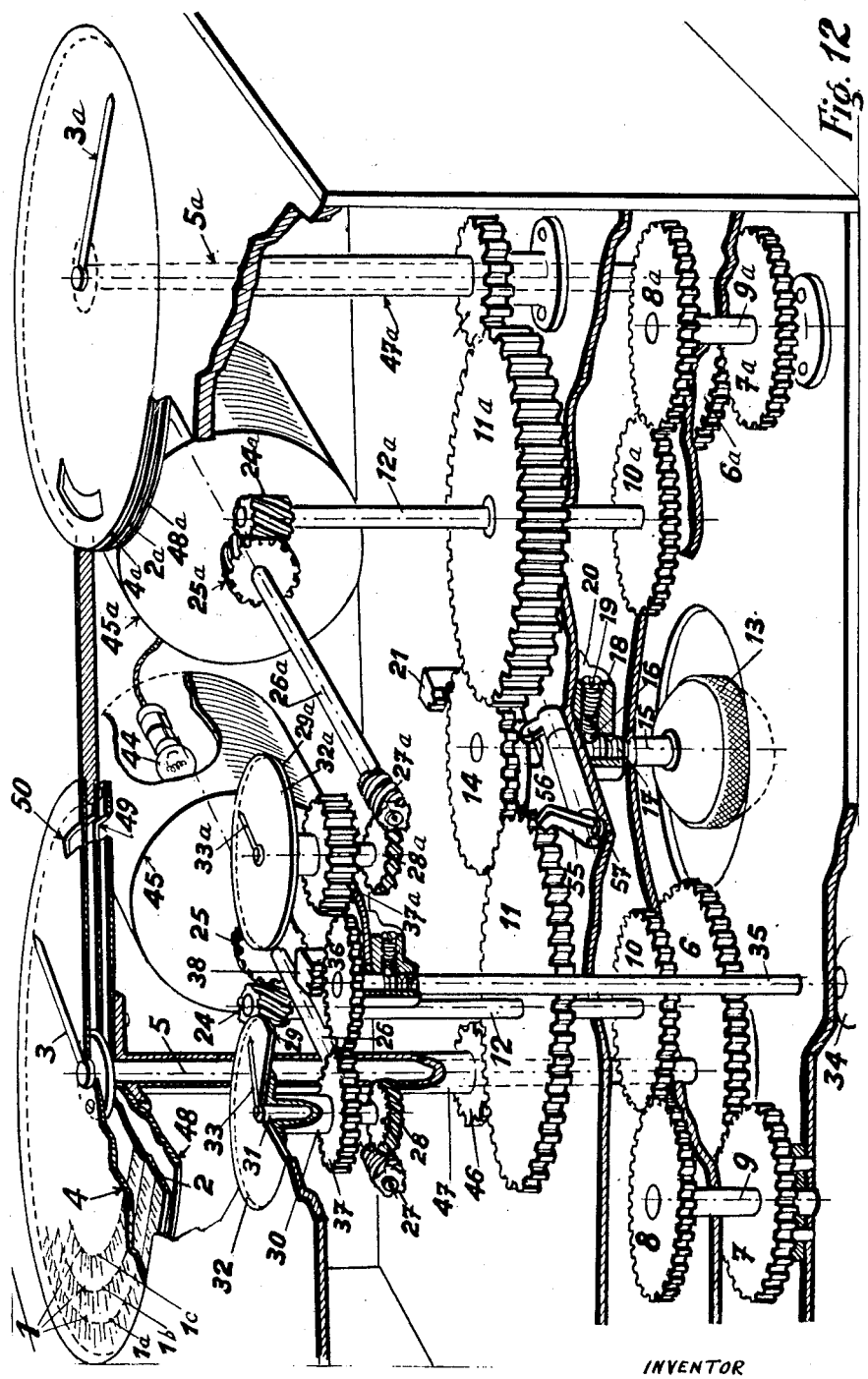
Fig. 12 is a view similar to that of Fig. 2 to which an amplifying reading drum has been added.

Fig. 9 shows the same outline, but closer, on an actual film or virtually reduced to a length equal to the developing of the cross section of a cylinder 87, preferably hollow, translucent and lighted from the inside by a lamp 44 (as shown on Fig. 12).

The same outline can be drawn in two ways. On Fig. 10, the scale is graduated on the cylinder 87 in divisions radiating towards the instantaneous center of the disc 86. In such a case, the accuracy of the readings can be increased to limits as wide as it is desired.

On Fig. 11, the scale is graduated (in front of the indexes of the apertures 85 of the surveying disc 86 stopping on lines of equal angular divisions of the scale) in values belonging to a geometric progression of ratio $r=m\sqrt{10}$, of which it is known that the percentage of the interval between two consecutive terms is constant and the smaller as $m$ is greater. The terms shown on the examples of Fig. 11 belong to a series of two thousand three hundred and twenty-six terms, of which the constant percentage of the interval between two consecutive terms is 1 per 1000.

The graduations of Figs. 10 and 11 may be combined on the same film or on the same cylinder so as to obtain, at will, a greater accuracy or a greater rapidity in effecting approached calculations.

Whatever the graduation chosen, Fig. 12 shows, by way of example, the adaptation of such an arrangement for extending the circular scale to a machine provided with a device for placing the decimal point.

The axis 26 of Fig. 12 carries a cylinder 45, translucent, hollow and preferably lighted from the inside by an electrical bulb 44. The cog wheel 11 of Fig. 12 drives the pinion 46 mounted on the hollow shaft 47 through which the axle 5 of the hand 3 extends freely. The hollow shaft 47 carries a surveying disc 48 with holes 49 at equal distances from each other. Said disc selects the numerical values of the cylinder 45 on the graduation or graduations made on its lateral surface.

All of the foregoing regarding the operation of the machine is true when the machine comprises the device for extending the circular scale, the reading being effected more conveniently or more accurately on the amplifying surface of the cylinder 45 than on the circular scale of the dial 2.

Fig. 12 shows that, starting from the top, are the concentric parts 4, 2, 48, but not integral to each other: 4 is a transparent disc mounted on the shaft 5 and carrying the hand 3; 2 is the fixed dial carrying the various graduations of the circular scale in which a partially circular aperture has been made, of a sufficient angular development, to allow reading of the numerical values indicated successively by the surveying index of each aperture 49 of the rotating surveying disc 48 the axis of which coincides with that of 4 and of 2.

Fig. 13 shows an additional mechanism which is not necessary if only approximate calculations are desired. Such a mechanism is used to obtain a more accurate adjustment, specially when the discontinuous curves (which are arcs of prolate cycloids) outlined on the film or the cylinder are graduated in unequal divisions similar to those of the conventional linear or circular slide rules. This additional mechanism permits a slight angular displacement of the index of the aperture 49 that has entered the width of the film or the cylinder, between the limits of two equidistant lines on the extended scale it carries.

To this end, a control knob 52 and a socket 53 are secured to the shaft 12 on which is locked a cog wheel 88 engaging then the pinion 46 fixed about the hollow shaft 47 carrying the disc 48 with apertures 49. The knob 52 and the socket 53 cooperate, under normal conditions, with a plate 54 through the leaf spring 51. One of the leaves of said spring has a finger 51' set in an oval aperture 54' of the plate 54, integral with the cog wheels 10 and 11.

The assembly comprising the gear wheel 10 and 11 and the plate 54 also carries above it a locking cog wheel which will be referred to later on.

The cog wheel 88 has the same number of teeth as the cog wheels 11 and 58, the cog wheel 14 being in its middle position locked by the rack 21 of Fig. 12, the calculation hand will not move if the knob 52 is manipulated which has no effect on the accuracy of the reading on the amplifying surface. But the manipulation of the knob 52 will allow, owing to the displacing of the finger 51' in the oval aperture 54', the index 49 to follow exactly the portion of the scale surveyed on the film or the cylinder between two successive divisions of the scale.

Figs. 14, 15 and 16 show a perspective view and Figs. 17, 18 and 19 an orthogonal outline of a mechanism for locking the calculation hand 3 of the left indicator or the left decimal point dial during the determination of a value on the right indicator or a suitable interval on the right decimal point dial.

Fig. 14 corresponds to Fig. 17, Fig. 15 to Fig. 18 and Fig. 16 to Fig. 19.

A locking finger 55 cooperating with a lever 56 is pushed by a spring 57 against a cog wheel 58 which has as many teeth as the wheel 11, each tooth of one wheel being exactly over another tooth of the other wheel.

In the upper position of the wheel 14 (Fig. 19) the finger 55 engages a clearance of the wheel 58 and thus locks the left indicator in a proper position.

In the middle position (Fig. 18) of the wheel 14, the lever 56 is in contact with the grade 59 of the ring 60 fixed to the wheel 14.

In the lower position (Fig. 17), the arm 56 is completely pushed outward by the ring 60, whereby the gearing 58 is unlocked and, consequently, the left indicator is also unlocked.

In the different embodiment illustrated in Fig. 20, there is disclosed a small sized machine, similar to a group of two comparators such as those used in the mechanical construction, assembled on a frame. In this figure dials 2 and 2a are shown as transparent for the purpose of showing the mechanism therebehind.

The graduation of the dial 2 is divided like the usual slide rules or circular slide rules; the hand 3 rotates on this dial under the pressure of the key 61 provided with a rack 62 pushed downwardly by an opposing spring 63. Only the spring 63a of the right indicator has been illustrated. Said rack 62 controls a pinion with a very small number of teeth 64 driving the hand 3 and the wheel 11, integral with the decimal point hand 33. The key 61 of the left indicator is controlled by a micrometer screw 65 extending through a nut 66. It is the same for the right indicator. The nuts 66 and 66a are fixed to a slide 67 slidable vertically on a mounting 68 mounted on the common frame. A micrometer screw 70 extending through the nut 84 secured to the said mounting 68 can move the slide 67 through the intermediary of the bearing 69.

It is then apparent that by adjusting the key 61 of each indicator to bring the hand 3 before a predetermined numerical value (except for the decimal point) that is to say to obtain the expression of the basis ratio A:B, it is sufficient to operate the milled button of the screw 70 to drive forward or backward simultaneously the two calculation hands 3 and 3a so as to show C under the calculation hand 3a of the right indicator. Then X will appear, except for the decimal point, under the hand 3 of the left indicator. As regards the placing of the decimal point, everything takes place as shown on Fig. 2, but the mechanism shown by way of example is different.

Figs. 21 and 22 show, for the left indicator and the right indicator respectively, the decimal point dial 29 of each indicator, integral with its pinion 37 through a hollow shaft 30 through which extends the shaft 31 of the wheel 11 carrying the decimal point hand 33. The pinion 37 of the decimal point dial of the left indicator is controlled by a rack 71, so is also the pinion 37a of the decimal point dial of the right indicator controlled by the rack 72.

The pinion 64 controlled by the calculation hand 3' of each indicator is illustrated on both figures showing that the two calculation hands 3' and 3a', the two decimal point hands 33 and 33a, the decimal point dials 29 and 29a, the two pinions 64 and 64a fixed to the calculation hands are in the same planes parallel to the plane of the calculation dials 2 and 2a, respectively. But the pinions 37 and 37a controlled by the two racks 71 and 72 are in different planes, these two racks being, however, at the same level with respect to the plane including the axles of the two calculation hands 3' and 3a'.

Between the two indicators is a shaft 73 carrying at its front extremity a button 74 and rearwards a pinion 75 gearing with the rack 72 controlling the decimal point dial 29a of the right indicator. Said pinion 75 has a conical finger 75' engaging anyone of the clearances 83 of a pinion 76 gearing with the rack 71 of the left indicator. Said pinion 76 is integral with the ratchet 77 with curved indentures engaged by a roller 78 mounted in a yoke 79 pressed down on said ratchet by an opposing spring 80. The pinion 76 and the ratchet 77 are integral with a hollow shaft carrying on its front extremity a milled button 81. The decimal point dials 29 and 29a, their pinions 37 and 37a as well as the ratchet 77 and the two pinions 75 and 76 have the same number of teeth or divisions, inclusive of the number of clearances of the pinion 76 which can be engaged by the finger 75'; the axle 73 being pushed forwards by the opposing spring 82. The simultaneous operation of the two decimal point dials is obtained by operating the button 81.

The operation of the decimal point dial of the right indicator alone is obtained by pushing the milled button 74 against the spring 82 so as to disengage the fingers 75' from the openings 83 of the pinion 76; the pinion 75 keeping in contact with the rack 72. The button 74 is turned moving rack 72 and turning the scale of dial 29 until the suitable division of the right decimal point dial appears under the decimal point hand 33a of the right indicator. Button 74 is then released and the finger 75' is locked again in one of the openings 83 of the pinion 76.

It would be redundant to describe the operation required for obtaining the result of a calculation, the decimal point being placed, since everything takes place like in the above description provided with reference to Fig. 1.

A machine similar to the one that has been described for obtaining calculations similar to those effected on a usual slide rule, but whose two series of terms, engraved at equal intervals on the extended scale of each indicator, would be in an arithmetical progression instead of being in geometrical progression, could be used as an adding machine or a substracting machine; one of the indicators would serve as an adding machine for the partial operations indicated on the other indicator.

Two paired indicators, with arithmetic series (but that can be disconnected) could be used for measuring, adding up or substracting the angular or linear displacements of a part of a machine to which it is connected, one of the indicators serving as an adding machine for the unitary operations indicated on the other indicator.

What I claim is:

1. Selecting device, comprising at least one fixed circular scale with indicia provided thereon, an indicating hand angularly moving on the center of said circular scale, an axle controlling said hand, means for transmitting the motion from said axle to said hand, an additional dial for indicating the decimal point of any numerical value indicated under said indicating hand, on said additional dial divisions graduated in powers of ten from an origin ten power nought, a hand called decimal point hand angularly moving on the center of said additional dial, means for displacing said decimal point hand from said additional dial from the axle controlling said indicating hand so as to allow said decimal point hand to pass on one division of said additional dial whenever said indicating hand passes on the origin of said circular scale, a member for operating said additional dial, and means for disconnecting said additional dial from said operating member.

2. Selecting device comprising at least one fixed circular scale with indicia provided thereon, an indicating hand angularly moving on the center of said circular scale, an axle controlling said hand, means for transmitting the motion from said axle to said hand, an additional dial for indicating the decimal point of any numerical value indicated under said indicating hand, on said additional dial intervals of divisions graduated in rows of the left first significant figure of said considered numerical value, a hand called decimal point hand angularly moving on the center of said additional dial, means for displacing said decimal point hand on said additional dial from the axle controlling said indicating hand so as to allow said decimal point hand to pass on one division of said additional dial whenever said indicating hand passes on the origin of said circular scale, a member for operating said additional dial, and means for disconnecting said additional dial from said operating member.

3. Selecting device comprising at least one fixed circular scale with indicia provided thereon, an indicating hand angularly moving on the center of said circular scale, an axle controlling said hand, means for transmitting the motion from said axle to said hand, a movable amplifying reading surface for extending said circular scale, a fixed index before which said movable amplifying surface passes, means for synchronizing the motion of said amplifying surface with that of said indicating hand so that the origin thereof may be in front of said index whenever said indicating hand passes on the origin of said circular scale.

4. Selecting device comprising at least one fixed circular scale with indicia provided thereon, an indicating hand angularly moving on the center of said circular scale, an axle controlling said hand, means for transmitting the motion from said axle to said hand, an amplifying reading film having several rows of terms, drums driving said film, a second film moving perpendicularly to the direction of said first film and in a plane parallel to that of said first film, and in proximity thereof, said second film having apertures with indexes for tracking on said first film and surveying parallel, oblique and discontinuous straight lines, and means for synchronizing the motion of said first film with that of said indicating hand.

5. Selecting device comprising at least one fixed circular scale with indicia provided thereon, an indicating hand angularly moving on the center of said circular scale, an axle controlling said hand, means for transmitting the motion from said axle to said hand, an amplifying reading film having several rows of terms, drums driving said film, a rotary survey disc moving in a plane parallel to that of said film and in the proximity thereof, said disc having apertures with indexes for tracking and surveying on said film parallel discontinuous portions of epicycloids, and means for synchronizing the motion of said first film with that of said indicating hand.

6. Selecting device comprising at least one fixed circular scale with indicia provided thereon, an indicating hand angularly moving on the center of said circular scale, an axle controlling said hand, means for transmitting the motion from said axle to said hand, an amplifying reading drum, a rotary survey disc moving in a plane tangent to the surface of said drum and in the proximity thereof, said disc having apertures with indexes for tracking and surveying on said drum parallel discontinous portions of curves, and means for synchronizing the motion of said amplifying drum with that of said indicating hand.

7. Selecting device comprising at least one fixed circular scale with indicia provided thereon, an indicating hand angularly moving on the center of said circular scale, an axle controlling said head, means for transmitting the motion from said axle to said hand, a hollow translucent amplifying reading drum, internal means for lightening said drum, a rotary survey disc moving in a plane tangent to the surface of said drum and in the proximity thereof, said disc having apertures with indexes for tracking and surveying on said drum parallel discontinuous portions of curves, and means for synchronizing the motion of said amplifying drum with that of said indicating hand.

8. Selecting device comprising at least one fixed circular scale with indicia provided thereon, an indicating hand angularly moving on the center of said circular scale, an axle controlling said hand, means for transmitting the motion from said axle to said hand, an amplifying reading drum, a rotary survey disc moving in a plane tangent to the surface of said drum and in the proximity thereof, said disc having apertures with indexes for drawing and surveying on said drum parallel discontinuous portions of curves, on said curves, division lines radiating towards the center of said disc, and means for synchronizing the motion of said amplifying drum with that of said indicating hand.

9. Selecting device comprising at least one fixed circular scale with indicia provided thereon, an indicating hand angularly moving on the center of said circular scale, an axle controlling said hand, means for transmitting the motion from said axle to said hand, an amplifying reading drum, a rotary survey disc moving in a plane tangent to the surface of said drum and in the proximity thereof, said disc having apertures with indexes for tracking and surveying on said drum parallel discontinuous portions of curves, on said curves equal angular division lines graduated in values belonging to a geometric progression of ratio $$r = \sqrt[n]{10}$$

and means for synchronizing the motion of said amplifying drum with that of said indicating hand.

10. Selecting device comprising at least one fixed circular scale with indicia provided thereon, an indicating hand angularly moving on the center of said circular scale, an axle controlling said hand, means for transmitting the motion from said axle to said hand, a movable amplifying reading surface, a rotary survey disc moving in a plane parallel to that of said surface and in the proximity thereof, said disc having apertures with indexes for tracking and surveying on said surface parallel discontinuous portions of curves, means for synchronizing the motion of said moving surface with that of said indicating hand, means operatively connecting said controlling axle of said indicating hand and said survey disc, a yielding connection between said axle controlling said indicating hand and said means for transmitting the motion to said hand, a mechanism for temporarily locking said transmitting means, and a member for angularly displacing said control axle during the operation of locking means.

11. Selecting device comprising at least one fixed circular scale with indicia provided thereon, an indicating hand angularly moving on the center of said circular scale, an axle controlling said hand, means for transmitting the motion from said axle to said hand, an additional dial for indicating the decimal point of any numerical value indicated under said indicating hand, a hand called decimal point hand angularly moving on the center of said additional dial, means for moving said decimal point hand on said additional dial from said control axle controlling said indicating hand so as to allow said decimal point hand to pass on one division of said additional dial whenever said indicating hand passes on the origin of said circular scale, a member for operating said additional dial, means for moving said additional dial from said operation member, a movable amplifying reading surface for extending said circular scale, a fixed index before which said movable amplifying surface passes, means for synchronizing the motion of said movable amplifying surface with that of said indicating hand so as to allow its origin to be in front of said index whenever said indicating hand passes on the origin of said circular scale whereby said amplifying surface can be slightly angularly displaced with respect to the index of the aperture between the limits of two equidistant lines on the extended scale of said surface.

12. Selecting device used for obtaining a circular scale slide rule, comprising two fixed circular scales placed side by side and having different centers, said scales having indicia marked thereon, two indicating hands each angularly moving on one of said centers of said circular scales respectively; a control axle for each indicating hand, two groups of gearings for transmitting the motion from said axles to said hands, a joining gearing axially movable and capable of occupying three successive positions in the first one of which it only engages one gearing of said two groups of transmitting gearings mounted on said control axle of the corresponding indicating hand, and in said second and third position it engages a gearing of each of said two groups of transmitting gearings mounted on said control axle of the corresponding indicating hand, a member for locking said movable joining gearing in its middle position, a member for operating said movable joining gearing allowing more particularly to control simultaneously the displacements of said two indicating hands.

13. Selecting device used for obtaining a circular scale slide rule, comprising two fixed circular scales placed side by side and having different centers, said scales having indicia marked thereon, two indicating hands each angularly moving on one of said centers of said circular scales respectively, a control axle for each indicating hand, two groups of gearing for transmitting the motion from said axles to said hands, a joining gearing axially movable and capable of occupying three successive positions in the first one of which it only engages one gearing of said two groups of transmitting gearings mounted on said control axle of the corresponding indicating hand and in the second and third position it engages a gearing of each of said groups of transmitting gearings mounted on the control axle of the corresponding indicating hand, a member for locking said movable joining gearing in its middle position, a member for operating said movable joining gearing and simultaneously controlling the displacements of said two indicating hands, a mechanism for locking one of said indicating hands while a value is being sought with the other indicating hand when said joining gearing is in the one of the three positions in which it engages the only gearing of the group of transmitting gearings corresponding to said other indicating hand.

14. Selecting device used for obtaining a circular scale slide rule, comprising two fixed circular scales placed side by side and having different centers, said circular scales having indicia marked thereon, two indicating hands angularly moving on one of said centers of said circular scales respectively, a control axle for each indicating hand, a key for actuating each of said control axles, a mechanism for transmitting the motion from each of said control axles to said indicating hands, a micrometer screw controlling each of said keys, a nut through which extends each of said micrometer screws, a slide carrying said two nuts, a mounting on which said slide is movable, a micrometer screw for moving said slide for controlling simultaneously the displacements of said two indicating hands.

15. Selecting device used for obtaining a circular slide rule, comprising two fixed circular slide rules placed side by side and having different centers, said scales having indicia marked thereon, two indicating hands angularly moving on one of said centers of said circular scales respectively, a control axle for each indicating hand, two mechanisms for transmitting the motion from said axles to said indicating hands, a joining and operating member for controlling simultaneously the displacements of said two indicating hands, two additional dials for each recording the decimal point of any numerical value indicated under one of said two indicating hands, a group of gearings for actuating each of said additional dials, a gearing movable axially and capable of occupying three positions successively so as to engage either one or both of said two gearing groups, a member for operating said axially movable gearing, a member for locking said axially movable gearing in its middle position in which it engages both said two groups of gearings, a hand called decimal point hand angularly moving on the center of each of said additional dials respectively, a mechanism for transmitting the motion from the control axle of each of said indicating hands to each of said decimal point hands allowing same to pass on one division of the additional dial to which it corresponds whenever the corresponding indicating hand passes on the origin of its dial.

16. Selecting device used for obtaining a circular scale slide rule, comprising two fixed circular scales placed side by side and having different centers, on said scales having indicia marked thereon, two indicating hands each angularly moving on one of the centers of said circular scales respectively, a control axle for each indicating hand, two mechanisms for transmitting the motion from said axles to said indicating hands, a joining and operating member for controlling simultaneously the displacements of said two indicating hands, two movable amplifying reading surfaces for extending each of said circular scales, two fixed indexes before each of which passes one of said movable amplifying surfaces, means for synchronizing the motion of each of said movable amplifying surfaces with that of the corresponding indicating surface so as to allow its origin to be in front of its corresponding index whenever said indicating hand passes on the origin of its circular scale.

17. Selecting device used for obtaining a circular scale slide rule, comprising two fixed circular scales placed side by side and having different centers, said scales having indicia marked thereon, two indicating hands each angularly moving on one of said centers of said circular scales respectively, a control axle for each indicating hand, two mechanisms for transmitting the motion from said axles to said indicating hands, a joining and operating member for controlling simultaneously the displacements of said two indicating hands, two amplifying reading drums, two rotary survey discs, each one moving in a plane tangent to the surface of one of said drums and in the proximity thereof, each of said discs having apertures with indexes for tracking and surveying on said drums portions of parallel discontinuous curves, means for synchronizing the motion of each of said amplifying drums with that of said corresponding indicating hand so as to allow its origin to be in front of its corresponding index whenever said indicating hand passes on the origin of its circular scale, mechanisms for transmitting the motion from the control axle of each of said indicating hands to each of said rotary survey discs.

18. Selecting device used for obtaining a circular scale slide rule, comprising two fixed circular scales placed side by side and having different centers, said scales having indicia marked thereon, two indicating hands each angularly moving on one of said centers of said circular scales respectively, a control axle for each indicating hand, two mechanisms for transmitting the motion from said axles to said indicating hands, a joining and operating member for controlling simultaneously the displacements of said two indicating hands, two amplifying reading drums, two rotary survey discs each moving in a plane tangent to the surface of one of said drums and in the proximity thereof, each of said discs having apertures with indexes for tracking and surveying on said drums portions parallel discontinuous curves, means for synchronizing the motion of each of said amplifying drums with that of said corresponding indicating hand so as to allow its origin to be in front of its corresponding index whenever said indicating hand passes on the origin of its circular scale, mechanisms for transmitting the motion from the control axle of each of said indicating hands to each of said rotary survey discs a yielding connection between the control axle of each of said indicating hands and the means for transmitting the motion to said hand, on the one hand, and to the corresponding survey disc on the other hand, a mechanism for temporarily locking each of said transmitting means, a member for angularly displacing through friction each of said control axles while the corresponding locking mechanism is operating allowing then each of said amplifying drums to be displaced with respect to the index of the aperture that has come over said drum between the limits of two equidistant lines of the extended scale of said drum.

19. Selecting device used for obtaining a circular scale slide rule, comprising two fixed circular scales placed side by side and having different centers, said scales having indicia marked thereon, two indicating hands each angularly moving on one of the centers of said circular scales respectively, a control axle for each indicating hand, two mechanisms for transmitting the motion from said axles to said indicating hands, a joining and operating member for controlling simultaneously the displacements of said two indicating hands, two additional dials for each indicating the decimal point of any numerical value indicated under one of said two indicating hands, a group of gearings for actuating each of said additional dials, an axially movable gearing capable of occupying three successive positions so as to engage either one or both said two groups of gearings, a member for operating said axially movable gearing, a member for locking said axially movable gearing in its middle position in which it engages both said groups of gearings, a hand called decimal point hand angularly moving on the center of each of said additional dials, a mechanism for transmitting the motion from the control axle of each of said indicating hands to each of said decimal point hands allowing it to pass on one division of the corresponding additional dial whenever the corresponding indicating hand passes on the origin of its dial, two amplifying reading drums, two rotary survey discs each one moving in a plane tangent to the surface of one of said drums and in the proximity thereof, on each of said discs having apertures with indexes for tracking and surveying on said drums portions of parallel discontinuous curves, means for synchronizing the motion of each of said amplifying drums with that of said corresponding indicating hand so as to allow its origin to be in front of its corresponding index whenever said indicating hand passes on the origin of its circular scale, and mechanisms for transmitting the motion from the control axle of each of said indicating hands to each of said rotary survey discs.

20. Selecting device used for obtaining a circular scale slide rule, comprising two fixed circular scales placed side by side and having different centers, said scales having indicia marked thereon, two indicating hands each angularly moving on one of said centers of said circular scales respectively, a control axle for each indicating hand, a key for actuating each of said control axles, a mechanism for transmitting the motion from each of said control axles to said indicating hands, a micrometer screw controlling each of said keys, a nut through which extends each of said micrometer screws, a slide carrying said two nuts, a mounting on which is movably mounted said slide, a micrometer screw for moving said slide for controlling simultaneously the displacements of said two indicating hands, two additional dials for indicating each the decimal point of any numerical value indicated under one of said two indicating hands, a hand called decimal point hand angularly moving on the center of each of said additional dials, a mechanism for transmitting the motion from each of said two indicating hands to each of said two decimal point hands allowing it to pass on one division of the corresponding additional dial whenever the corresponding indicating hand passes on the origin of its dial, two groups of gearings and rack controlling said additional dials, two gearings each engaging the rack of one of said groups, a finger secured to one of said two gearings and adapted to interlock them, a ratchet integral with the other one of said gearings, a spring member engaging said ratchet, a member for operating said two additional dials through said ratchet and said two interlocked gearings, a spring member for unlocking said two gearings and for controlling only one of said two additional dials.

JULIEN MARIE ANDRÉ ALLAIS.

References Cited in the file of this patent

UNITED STATES PATENTS

| Number | Name | Date |
| --- | --- | --- |
| 902,667 | Loughry | Nov. 3, 1908 |
| 2,117,413 | Gilmore | May 17, 1938 |
| 2,285,774 | Horner | June 9, 1942 |
| 2,293,459 | Ewing | Aug. 18, 1942 |
| 2,375,878 | Willens | May 15, 1945 |
| 2,572,811 | Jullien | Oct. 23, 1951 |